(12) United States Patent
Kim et al.

(10) Patent No.: US 10,655,709 B2
(45) Date of Patent: May 19, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Jin Ho Kim, Suwon-si (KR); Jae Joon Lee, Anyang-si (KR); Jong Sool Park, Seongnam-si (KR); Kyeong Hun Lee, Seoul (KR); Jong Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/197,204

(22) Filed: Nov. 20, 2018

(65) Prior Publication Data

US 2020/0072320 A1    Mar. 5, 2020

(30) Foreign Application Priority Data

Aug. 28, 2018   (KR) .......................... 10-2018-0101599

(51) Int. Cl.
*F16H 3/62*  (2006.01)
(52) U.S. Cl.
CPC ....... *F16H 3/62* (2013.01); *F16H 2200/0069* (2013.01); *F16H 2200/2015* (2013.01); *F16H 2200/2046* (2013.01)

(58) Field of Classification Search
CPC .............. F16H 3/62; F16H 2200/0069; F16H 2200/2015; F16H 2200/2046
See application file for complete search history.

(56) References Cited

U.S. PATENT DOCUMENTS 9,163,705 B1* 10/2015 Hwang ................... F16H 3/666
2018/0328459 A1* 11/2018 Kim .......................... F16H 3/62

FOREIGN PATENT DOCUMENTS

KR     10-2017-0108440 A       9/2017

\* cited by examiner

*Primary Examiner* — Huan Le
(74) *Attorney, Agent, or Firm* — Morgan, Lewis & Bockius LLP

(57) ABSTRACT

A planetary gear train of an automatic transmission for a vehicle may include an input shaft configured to receive power, an output shaft configured to output power; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a fifth planetary gear set including thirteenth, fourteenth, and fifteenth rotation elements; and first to ninth shafts connecting the rotation elements of the first to fifth planetary gear sets.

18 Claims, 2 Drawing Sheets

| Shift Stage | Coupling Element | | | | | | Gear Ratio | Inter-Stage Ratio |
|---|---|---|---|---|---|---|---|---|
| | CL1 | CL2 | CL3 | B1 | B2 | B3 | | |
| 1st Stage | ● | | ● | | ● | | 3.943 | − |
| 2nd Stage | ● | | | ● | ● | | 2.64 | 1.494 |
| 3rd Stage | ● | | | ● | | ● | 1.856 | 1.422 |
| 4th Stage | ● | | ● | | | ● | 1.475 | 1.258 |
| 5th Stage | ● | ● | | | | ● | 1.2 | 1.229 |
| 6th Stage | ● | ● | ● | | | | 1.000 | 1.200 |
| 7th Stage | ● | ● | | ● | | | 0.795 | 1.258 |
| 8th Stage | | ● | | ● | | ● | 0.653 | 1.217 |
| 9th Stage | | ● | | ● | ● | | 0.548 | 1.192 |
| 10th Stage | | ● | | | ● | ● | 0.439 | 1.248 |
| R-Stage | | | ● | | ● | ● | −3.016 | − |

PLANETARY GEAR TRAIN OF AUTOMATIC TRANSMISSION FOR VEHICLE

CROSS REFERENCE TO RELATED APPLICATION

The present application claims priority to Korean Patent Application No. 10-2018-0101599, filed Aug. 28, 2018, the entire contents of which is incorporated herein for all purposes by this reference.

BACKGROUND OF THE INVENTION

Field of the Invention

The present invention relates to a planetary gear train of an automatic transmission for a vehicle.

Description of Related Art

Multi-staging of a transmission aims to improve the fuel efficiency of a vehicle by facilitating operation of an engine in a more efficient region over the entire driving range of a vehicle, and to improve the driving performance of the vehicle by rapidly providing a more suitable gear ratio in a response to a driver's demand.

Therefore, to achieve the above-mentioned effect of multi-staging of the transmission as described above, it is preferable for an inter-stage ratio, which is a difference in gear ratio between adjacent shifting stages, to be appropriately secured while increasing a gear ratio span, which is the total gear ratio range which may be provided by the transmission, and for the inter-stage ratio to change in as linear a manner as possible.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle, which is configured for providing 10 forward shifting stages and a reverse stage and ensuring sufficient durability due to the relatively low torque which is borne by components thereof while ensuring a wide gear ratio span, an inter-stage ratio of a predetermined level or more, and linearity of the inter-stage ratios.

To achieve the above-described aspect, a planetary gear train of an automatic transmission for a vehicle may include: an input shaft configured to receive power; an output shaft configured to output power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a fifth planetary gear set having thirteenth, fourteenth, and fifteenth rotation elements; a first shaft connected to the first rotation element and to the input shaft; a second shaft connected to the fourteenth rotation element and to the output shaft; a third shaft connected to the third rotation element; a fourth shaft connected to the sixth rotation element, to the eleventh rotation element, and to the fifteenth rotation element; a fifth shaft connected to the seventh rotation element and to the thirteenth rotation element; a sixth shaft connected to the eighth rotation element and to the twelfth rotation element; a seventh shaft connected to the second rotation element and to the fourth rotation element; an eighth shaft connected to the fifth rotation element and to the ninth rotation element; and a ninth shaft connected to the tenth rotation element.

The planetary gear train may include six coupling elements configured to selectively connect two shafts among the first to ninth shafts or the transmission housing and a shaft among the first to ninth shafts, and three coupling elements among the six coupling elements may be operatively controlled such that a specific shifting stage among the forward and reverse shifting stages is implemented.

The six coupling elements may include: three clutches configured to interconnect two shafts among the first to ninth shafts; and three brakes configured to selectively connect a shaft, which is not connected to the input shaft or the output shaft among the first to ninth shafts, to the transmission housing.

The six coupling elements may include: a first clutch mounted between the first shaft and the fifth shaft; a second clutch mounted between the first shaft and the sixth shaft; a third clutch mounted between the third shaft and the sixth shaft; a first brake mounted between the seventh shaft and the transmission housing; a second brake mounted between the eighth shaft and the transmission housing; and a third brake mounted between the ninth shaft and the transmission housing.

The first, second, and third rotation elements may include a first sun gear, a first planet carrier, and a first ring gear; the fourth, fifth, and sixth rotation elements may include a second sun gear, a second planet carrier, and a second ring gear; the seventh, eighth, and ninth rotation elements may include a third sun gear, a third planet carrier, and a third ring gear; the tenth, eleventh, and twelfth rotation elements may include a fourth sun gear, a fourth planet carrier, and a fourth ring gear; and the thirteenth, fourteenth, and fifteenth rotation elements may include a fifth sun gear, a fifth planet carrier, and a fifth ring gear.

The first to fifth planetary gear sets may be mounted in the order of the first, second, third, fourth, and fifth planetary gear sets from one side to the other side thereof.

Furthermore, the planetary gear train of the automatic transmission for a vehicle according to an exemplary embodiment of the present invention may include: a first planetary gear set having three rotation elements, one of which is connected to an input shaft; a second planetary gear set having three rotation elements, one of which is continuously connected to any one of the first to third rotation elements of the first planetary gear set; a third planetary gear set having three rotation elements, one of which is connected to the input shaft in a disconnectable manner by a first clutch, another one of which is connected to two rotation elements of the first planetary gear set in a disconnectable manner by a second clutch and a third clutch, respectively, and a remaining one of which is continuously connected to one rotation element of the second planetary gear set; a fourth planetary gear set having three rotation elements, one of which is continuously connected to any one of the first to third rotation elements of the third planetary gear set; a fifth planetary gear set having three rotation elements, one of which is continuously connected to one rotation element of the third planetary gear set, another one of which is connected to the output shaft, and a remaining one of which is continuously connected to one rotation element of the fourth planetary gear set; a first brake mounted to restrain rotation of the rotation element which is continuously connected to the rotation element of the first planetary gear set, among the first to third rotation elements of the second planetary gear set; a second brake mounted to restrain rotation of the rotation element which is continuously connected to the rotation element of the third planetary gear set, among the first to third rotation elements of the second planetary gear set; and a third brake mounted to restrain rotation of the remaining rotation element, which is not any of the other rotation elements, among the first to third rotation elements of the fourth planetary gear set.

The rotation element of the first planetary gear set, which is connected to the input shaft, may be a first rotation element; a first rotation element of the second planetary gear set may be continuously connected to a second rotation element of the first planetary gear set; a first rotation element of the third planetary gear set may be connected to the input shaft in a disconnectable manner, a second rotation element of the third planetary gear set may be connected to each of the first rotation element and the third rotation element of the first planetary gear set in a disconnectable manner, and a third rotation element of the third planetary gear set may be continuously connected to the second rotation element of the second planetary gear set; the third rotation element of the fourth planetary gear set may be continuously connected to the second rotation element of the third planetary gear set; and a first rotation element of the fifth planetary gear set may be continuously connected to the first rotation element of the third planetary gear set, a second rotation element of the fifth planetary gear set may be directly connected to the output shaft, and a third rotation element of the fifth planetary gear set may be continuously connected to the second rotation element of the fourth planetary gear set.

The first rotation element of the first planetary gear set may be a first sun gear, the second rotation element of the first planetary gear set may be a first planet carrier, and the third rotation element of the first planetary gear set may be a first ring gear; the first rotation element of the second planetary gear set may be a second sun gear, the second rotation element of the second planetary gear set may be a second planet carrier, and the third rotation element of the second planetary gear set may be a second ring gear; the first rotation element of the third planetary gear set may be a third sun gear, the second rotation element of the third planetary gear set may be a third planet carrier, and the third rotation element of the third planetary gear set may be a third ring gear; the first rotation element of the fourth planetary gear set may be a fourth sun gear, the second rotation element of the fourth planetary gear set may be a fourth planet carrier, and the third rotation element of the fourth planetary gear set may be a fourth ring gear; and the first rotation element of the fifth planetary gear set may be a fifth sun gear, the second rotation element of the fifth planetary gear set may be a fifth planet carrier, and the third rotation element of the fifth planetary gear set may be a fifth ring gear.

The first brake may be mounted to restrain rotation of the first planet carrier of the first planetary gear set and the second sun gear of the second planetary gear set, the second brake may be mounted to restrain rotation of the second planet carrier of the second planetary gear set, and the third brake may be mounted to restrict rotation of the fourth sun gear of the fourth planetary gear set.

The first clutch may be mounted to connect the third sun gear of the third planetary gear set and the input shaft in a disconnectable manner, the second clutch may be mounted to the third planet carrier of the third planetary gear set and the first sun gear of the first planetary gear set in a disconnectable manner, and the third clutch may be mounted to connect the third planet carrier of the third planetary gear set and the first ring gear of the first planetary gear set in a disconnectable manner.

The input shaft and the output shaft may be mounted concentrically, and the first to fifth planetary gear sets may be mounted in the order of the first planetary gear set, the second planetary gear set, the third planetary gear set, the fourth planetary gear set, and the fifth planetary gear set in a direction from the input shaft toward the output shaft.

Furthermore, the planetary gear train of the automatic transmission for a vehicle according to an exemplary embodiment of the present invention may include: a first planetary gear set, a second planetary gear set, a third planetary gear set, a fourth planetary gear set, and a fifth planetary gear set, each of which may include three rotation elements; six coupling elements configured to provide a variable frictional force; and nine shafts connected to the rotation elements of the planetary gear sets.

The first shaft is directly connected to the first rotation element of the first planetary gear set and to the input shaft, the second shaft is directly connected to the second rotation element of the fifth planetary gear set and to the output shaft, the third shaft is directly connected to the third rotation element of the first planetary gear set, the fourth shaft is directly connected to the third rotation element of the second planetary gear set, to the second rotation element of the fourth planetary gear set, and to the third rotation element of the fifth planetary gear set, the fifth shaft is directly connected to the first rotation element of the third planetary gear set and to the first rotation element of the fifth planetary gear set, the sixth shaft is directly connected to the second rotation element of the third planetary gear set and to the third rotation element of the fourth planetary gear set, and the remaining three shafts are mounted to be configured for being fixed to the transmission housing.

The remaining three shafts, which are configured for being fixed to the transmission housing, may include the seventh shaft, the eighth shaft, and the ninth shaft, the seventh shaft may be directly connected to the second rotation element of the first planetary gear set and to the first rotation element of the second planetary gear set, the eighth shaft may be directly connected to the second rotation element of the second planetary gear set and to the third rotation element of the third planetary gear set, and the ninth shaft may be directly connected to the first rotation element of the fourth planetary gear set.

Among the six coupling elements, the first clutch may be mounted between the first shaft and the fifth shaft, the second clutch may be mounted between the first shaft and the sixth shaft, the third clutch may be mounted between the third shaft and the sixth shaft, the first brake may be mounted between the seventh shaft and the transmission housing, the second brake may be mounted between the eighth shaft and the transmission housing, and the third brake may be mounted between the ninth shaft and the transmission housing.

The first to fifth planetary gear sets may be mounted in the order of the first planetary gear set, the second planetary gear set, the third planetary gear set, the fourth planetary gear set, and the fifth planetary gear set in the axial direction of the input shaft and the output shaft.

The rotation elements of each of the first to fifth planetary gear sets may be mounted in the order of the first rotation elements, the second rotation elements, and the third rotation elements toward the radially external side from the rotation center.

A planetary gear train of an automatic transmission for a vehicle according to an exemplary embodiment of the present invention forms shifting stages of 10 forward speeds and 1 reverse speed and has a gear ratio span of 9.0. Thus, the fuel efficiency of the vehicle may be improved by making it possible to drive the engine mainly in a more efficient region.

Furthermore, according to an exemplary embodiment of the present invention, it is possible to achieve the minimum inter-stage ratio of 1.192 or more and linearity in the change of the inter-stage ratio according to the change of the shifting stage. Thus, vehicle acceleration, the sense of the sense of rhythm of engine speed, and the like before and after shifting may be improved, so that the driving performance of the vehicle may be maximized.

Furthermore, according to an exemplary embodiment of the present invention, it is possible to ensure sufficient durability due to the relatively low torque which is borne by components while ensuring a wide gear ratio span, an inter-stage ratio of a predetermined level or more, and linearity of the inter-stage ratios.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and the particular intended application and use environment shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
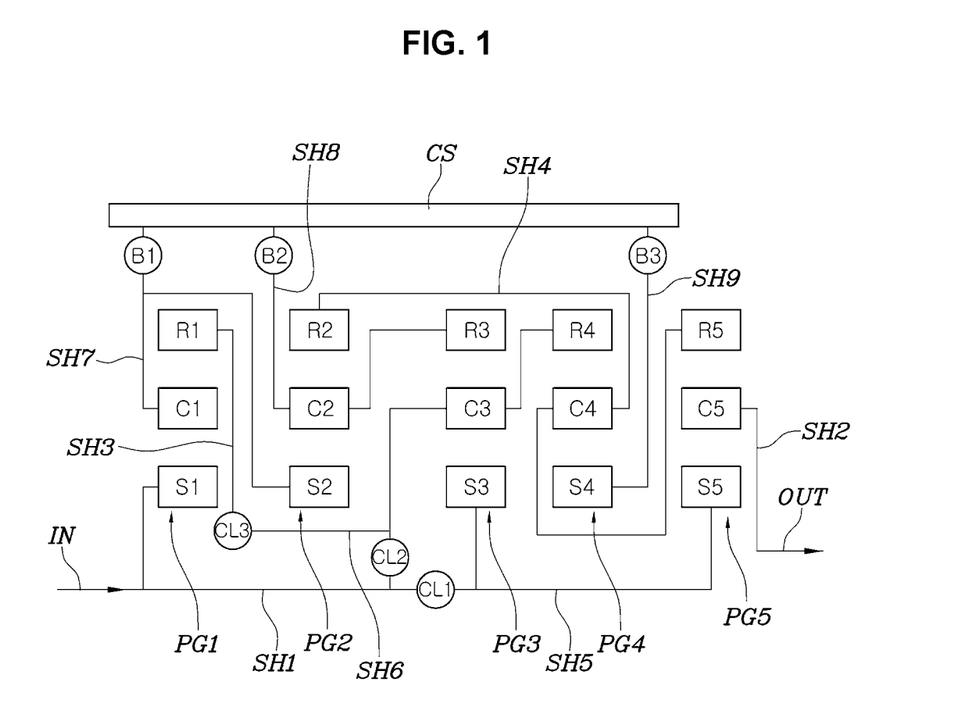
FIG. 1 is a view exemplarily illustrating various exemplary embodiments of a planetary gear train of an automatic transmission for a vehicle according to an exemplary embodiment of the present invention.

Referring to FIG. 1, a planetary gear train of an automatic transmission for a vehicle of the present invention includes: an input shaft IN configured to receive power from a power source such as an engine or the like; an output shaft OUT configured to output power; a first planetary gear set PG1 including first, second, and third rotation elements; a second planetary gear set PG2 including fourth, fifth, and sixth rotation elements; a third planetary gear set PG3 including seventh, eighth, and ninth rotation elements; a fourth planetary gear set PG4 including tenth, eleventh, and twelfth rotation elements; and a fifth planetary gear set PG5 including the thirteenth, fourteenth, and fifteenth rotation elements.

The planetary gear train includes: a first shaft SH1 connected to the first rotation element and to the input shaft IN; a second shaft SH2 connected to the fourteenth rotation element and to the output shaft OUT; a third shaft SH3 connected to the third rotation element; a fourth shaft SH4 connected to the sixth rotation element, to the eleventh rotation element, and to the fifteenth rotation element; a fifth shaft SH5 connected to the seventh rotation element and to the thirteenth rotation element; a sixth shaft SH6 connected to the eighth rotation element and to the twelfth rotation element; a seventh axis SH7 connected to the second rotation element and to the fourth rotation element; an eighth shaft SH8 connected to the fifth rotation element and to the ninth rotation element; and a ninth shaft SH9 connected to the tenth rotation element.

The first to fifth planetary gear sets PG1 to PG5 are mounted in the order of the first planetary gear set PG1, the second planetary gear set PG2, the third planetary gear set PG3, the fourth planetary gear set PG4, and the fifth planetary gear set PG5 from one side toward the other side thereof with respect to an engine side.

That is, a power source such as an engine is configured to provide power through the input shaft IN from the engine side and the first shaft SH1, and the power supplied as described above is configured to be appropriately shifted through the configuration of the present invention, in which the first planetary gear set PG1, the second planetary gear set PG2, the third planetary gear set PG3, the fourth planetary gear set PG4, and the fifth planetary gear the set PG5 are mounted in order, and then to be drawn to the output shaft OUT through the fourteenth rotation element of the fifth planetary gear set PG5 and the second shaft SH2.

Each of the first planetary gear set PG1, the second planetary gear set PG2, the third planetary gear set PG3, the fourth planetary gear set PG4, and the fifth planetary gear set PG5, which form the planetary gear train described above, is configured as a single pinion planetary gear set having three rotation elements.

The planetary gear train is mounted in a transmission housing CS, a torque converter may be provided between the power source such as the engine and the input shaft IN, and the power drawn to the output shaft OUT may be transmitted to a drive wheel of the vehicle through a differential.

The planetary gear train includes six coupling elements for selectively connecting two shafts among the first to ninth shafts SH1 to SH9 or the transmission housing CS and a shaft among the first to ninth shafts SH1 to SH9, and three coupling elements among the six coupling elements are operatively controlled to be simultaneously coupled to each other such that a reverse shifting stage is implemented.

Figure 2:
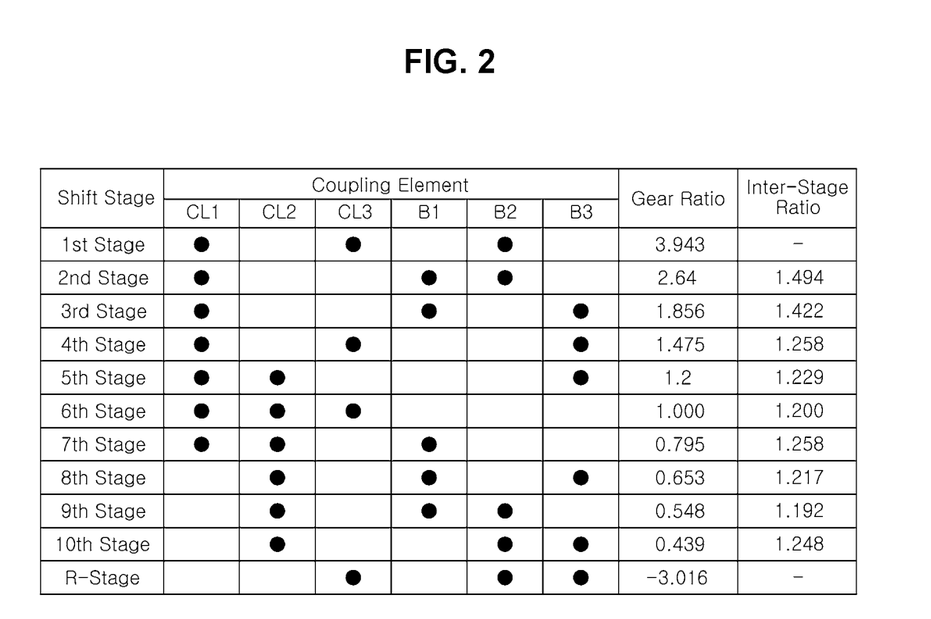
FIG. 2 is an operation table of the planetary gear train of FIG. 1.

That is, in implementing any one of 1 to 10 forward shifting stages and an R stage, which is a reverse stage, as illustrated in FIG. 2, it is possible to combine three specified coupling elements among the six coupling elements to implement a corresponding shifting stage.

Of course, the planetary gear train is configured to enable clutch-to-clutch shifting, in which, when shifting to an adjacent speed change stage among the shifting stages, shifting is performed by releasing one coupling element, at the current shifting stage, from the three coupling elements required for implementing each shifting stage, and at the same time, by coupling another coupling element at a target shifting stage.

The six coupling elements include three clutches that connect two shafts among the first to ninth shafts SH1 to SH9, and three brakes that selectively connect the transmission housing CS and a shaft which is not connected to the input shaft IN or the output shaft OUT among the first to ninth shafts SH1 to SH9.

In the various exemplary embodiments of FIG. 1, the six coupling elements include a first clutch CL1 mounted between the first shaft SH1 and the fifth shaft SH5, a second clutch CL2 mounted between the first shaft SH1 and the sixth shaft SH6, a third clutch CL3 mounted between the third shaft SH3 and the sixth shaft SH6, a first brake B1 mounted between the seventh shaft SH7 and the transmission housing CS, a second brake B2 mounted between the eighth shaft SH8 and the transmission housing CS, and a third brake B3 mounted between the ninth shaft SH9 and the transmission housing CS.

In the exemplary embodiment described above, the first, second, and third rotation elements include a first sun gear S1, a first planet carrier C1, and a first ring gear R1, the fourth, fifth, and sixth rotation elements include a second sun gear S2, a second planet carrier C2, and a second ring gear R2, the seventh, eighth, and ninth rotation elements include a third sun gear S3, a third planet carrier C3, and a third ring gear R3, the tenth, eleventh and twelfth rotation elements include a fourth sun gear S4, a fourth planet carrier C4, and a fourth ring gear R4, and the thirteenth, fourteenth, and fifteenth rotation elements include a fifth sun gear S5, a fifth planet carrier C5, and a fifth ring gear R5.

Furthermore, the planetary gear train of the automatic transmission for a vehicle of the present invention illustrated in FIG. 1 may be expressed as follows.

That is, the planetary gear train of the automatic transmission for a vehicle of the present invention includes: a first planetary gear set PG1 having three rotation elements, one of which is connected to an input shaft IN; a second planetary gear set PG2 having three rotation elements, one of which is continuously connected to any one of the first to third rotation elements of the first planetary gear set PG1; a third planetary gear set PG3 having three rotation elements, one of which is connected to the input shaft in a disconnectable manner by a first clutch CL1, another one of which is connected to two rotation elements of the first planetary gear set PG1 in a disconnectable manner by a second clutch CL2 and a third clutch CL3, respectively, and a remaining one of which is continuously connected to one rotation element of the second planetary gear set PG2; a fourth planetary gear set PG4 having three rotation elements, one of which is continuously connected to any one of the first to third rotation elements of the third planetary gear set PG3; a fifth planetary gear set PG5 having three rotation elements, one of which is continuously connected to one rotation element of the third planetary gear set PG3, another one of which is connected to the output shaft OUT, and a remaining one of which is continuously connected to one rotation element of the fourth planetary gear set PG4; a first brake B1 mounted to restrain rotation of the rotation element which is continuously connected to the rotation element of the first planetary gear set PG1, among the first to third rotation elements of the second planetary gear set PG2; a second brake B2 mounted to restrain rotation of the rotation element which is continuously connected to the rotation element of the third planetary gear set PG3, among the first to third rotation elements of the second planetary gear set PG2; and a third brake B3 mounted to restrain rotation of the remaining rotation element, which is not connected to any other rotation element, among the first to third rotation elements of the fourth planetary gear set PG4.

The rotation element of the first planetary gear set PG1 connected to the input shaft IN is a first rotation element; a first rotation element of the second planetary gear set PG2 is continuously connected to a second rotation element of the first planetary gear set PG1; a first rotation element of the third planetary gear set PG3 is connected to the input shaft in a disconnectable manner, a second rotation element of the third planetary gear set PG3 is connected to each of the first rotation element and the third rotation element of the first planetary gear set PG1 in a disconnectable manner, and a third rotation element of the third planetary gear set PG3 is continuously connected to the second rotation element of the second planetary gear set PC2; a third rotation element of the fourth planetary gear set PG4 is continuously connected to the second rotation element of the third planetary gear set PG3; a first rotation element of the fifth planetary gear set PG5 is continuously connected to the first rotation element of the third planetary gear set PG3, a second rotation element of the fifth planetary gear set PG5 is directly connected to the output shaft OUT, and a third rotation element of the fifth planetary gear set PG5 is continuously connected to the second rotation element of the fourth planetary gear set PG4.

The first brake B1 is mounted to restrict rotation of the first planet carrier C1 of the first planetary gear set PG1 and the second sun gear S2 of the second planetary gear set PG2, the second brake B2 is mounted to restrain rotation of the second planet carrier C2 of the second planetary gear set PG2, and the third brake B3 is mounted to restrict rotation of the fourth sun gear S4 of the fourth planetary gear set PG4.

The first clutch CL1 is mounted to connect the third sun gear S3 of the third planetary gear set PG3 and the input shaft in a disconnectable manner, the second clutch CL2 is mounted to connect the third planet carrier C3 of the third planetary gear set PG3 and the first sun gear S1 of the first planetary gear set PG1 in a disconnectable manner, and the third clutch CL3 is mounted to connect the third planet carrier C3 of the third planetary gear set PG3 and the first ring gear R1 of the first planetary gear set PG1 in a disconnectable manner.

Furthermore, the planetary gear train of the automatic transmission for a vehicle of the present invention illustrated in FIG. 1 may be expressed as follows.

That is, the planetary gear train of an automatic transmission for a vehicle according to an exemplary embodiment of the present invention includes a first planetary gear set PG1, a second planetary gear set PG2, a third planetary gear set PG3, a fourth planetary gear set PG4, and a fifth planetary gear set PG5, each of which may include three rotation elements; six coupling elements configured to provide a variable frictional force; and nine shafts connected to the rotation elements of the planetary gear sets.

Here, the first shaft SH1 is directly connected to the first rotation element of the first planetary gear set PG1 and to the input shaft IN, the second shaft SH2 is directly connected to the second rotation element of the fifth planetary gear set PG5 and to the output shaft OUT, the third shaft SH3 is directly connected to the third rotation element of the first planetary gear set PG1, the fourth shaft SH4 is directly connected to the third rotation element of the second planetary gear set PG2, to the second rotation element of the fourth planetary gear set PG4, and to the third rotation element of the fifth planetary gear set PG5, the fifth shaft SH5 is directly connected to the first rotation element of the third planetary gear set PG3 and to the first rotation element of the fifth planetary gear set PG5, the sixth shaft SH6 is directly connected to the second rotation element of the third planetary gear set PG3 and to the third rotation element of the fourth planetary gear set PG4, the seventh shaft SH7 is directly connected to the second rotation element of the first planetary gear set PG1 and to the first rotation element of the second planetary gear set PG2, the eighth shaft SH8 is directly connected to the second rotation element of the second planetary gear set PG2 and to the third rotation element of the third planetary gear set PG3, and the ninth shaft SH9 is directly connected to the first rotation element of the fourth planetary gear set PG4.

Among the six coupling elements, the first clutch CL1 is mounted between the first shaft SH1 and the fifth shaft SH5, the second clutch CL2 is mounted between the first shaft SH1 and the sixth shaft SH6, the third clutch CL3 is mounted between the third shaft SH3 and the sixth shaft SH6, the first brake B1 is mounted between the seventh shaft SH7 and the transmission housing, the second brake B2 is mounted between the eighth shaft SH8 and the transmission housing, and the third brake B3 is mounted between the ninth shaft SH9 and the transmission housing.

The first to fifth planetary gear sets PG1 to PG5 are mounted in the axial direction of the input shaft IN and the output shaft OUT in the order of the first planetary gear set PG1, the second planetary gear set PG2, the third planetary gear set PG3, the fourth planetary gear set PG4, and the fifth planetary gear set PG5.

The rotation elements of each of the first to fifth planetary gear sets PG1 to PG 5 are mounted in an order of the first rotation element, the second rotation element, and the third rotation element toward a radially external side from a rotation center thereof.

The planetary gear train of an automatic transmission for a vehicle according to an exemplary embodiment of the present invention configured as described above implements shifting stages according to an operation table as represented in FIG. 2.

The first shifting stage is implemented by causing the first clutch CL1, the third clutch CL3, and the second brake B2 to be engaged with each other.

By the engagement of the first clutch CL1, the power of the input shaft IN and the first shaft SH1 is supplied to the first sun gear S1 of the first planetary gear set PG1, and is directly transmitted to the third sun gear S3 of the third planetary gear set PG3 and to the fifth sun gear S5 of the fifth planetary gear set PG5.

Since the second brake B2 is engaged and thus the third ring gear R3 of the third planetary gear set PG3 is fixed by the eighth shaft SH8, the power supplied to the third sun gear S3 is made slower through the third planet carrier C3 to be transmitted to the fourth ring gear R4 and is simultaneously transmitted to the first ring gear R1 through the third clutch CL3, and the rotational force of the first planet carrier C1 determined by the rotation of the first ring gear R1 and the first sun gear S1 is transmitted to the second sun gear S2 through the seventh shaft SH7. Since the second planet carrier C2 is fixed, the power transmitted to the second sun gear S2 is reversed and transmitted to the second ring gear R2 and is then transmitted to the fourth planet carrier C4 and the fifth ring gear R5 through the fourth shaft SH4.

Therefore, the power transmitted to the fifth sun gear S5 is made slower by the reaction force provided as the fifth ring gear R5 is reversely rotated to be output and drawn out to the second shaft SH2 and the output shaft OUT as a first shifting stage is formed by the fifth planet carrier C5.

A second shifting stage is implemented by releasing the third clutch CL3 from the first shifting stage state and engaging the first brake B1.

In the state where the first brake B1 and the second brake B2 are engaged and thus the seventh shaft SH7 and the eighth shaft SH8 are fixed, the power of the input shaft IN is transmitted to the third sun gear S3 and the fifth sun gear S5 simultaneously through the first sun gear S1 as well as the first clutch CL1, and is then shifted and made slower by the fifth planet carrier C5 of the fifth planetary gear set PG5, forming the second shifting stage.

A third shifting stage is implemented by releasing the second brake B2 from the second shifting stage state and engaging the third brake B3.

In the state where the first brake B1 and the third brake B3 are engaged and thus the first planet carrier C1 and the second sun gear S2 connected to the seventh shaft SH7 are fixed and the fourth sun gear S4 is fixed, the power of the input shaft IN is input to the first sun gear S1, the third sun gear S3, and the fifth sun gear S5, and is then shifted and made slower by the fifth planet carrier C5 of the fifth planetary gear set PG5, forming the third shifting stage.

A fourth shifting stage is implemented by releasing the first brake B1 from the third shifting stage state and engaging the third clutch CL3.

In the state where the third brake B3 is engaged and thus the fourth sun gear S4 connected to the ninth shaft SH9 is fixed, the power of the input shaft IN is input to the first sun gear S1, the third sun gear S3, and the fifth sun gear S5, and is then shifted and made slower by the fifth planet carrier C5 of the fifth planetary gear set PG5, forming the fourth shifting stage.

A fifth shifting stage is implemented by releasing the third clutch CL3 from the fourth shifting stage state and engaging the second clutch CL2.

In the state where the third brake B3 is engaged and thus the fourth sun gear S4 connected to the ninth shaft SH9 is fixed, the power of the input shaft IN is input to the first sun gear S1, the third sun gear S3, and the fifth sun gear S5, and is then shifted and made slower by the fifth planet carrier C5 of the fifth planetary gear set PG5, forming the fifth shifting stage.

A sixth shifting stage is implemented by releasing the third brake B3 from the fifth shifting stage state and engaging the third clutch CL3.

That is, in the state where all of the first clutch CL1, the second clutch CL2, and the third clutch CL3 are engaged, all the first to third rotation elements of the first planetary gear set PG1 are integrated by the engagement of the second clutch CL2 and the third clutch CL3, and the third sun gear S3 and the third planet carrier C3 are integrated by the first clutch CL1. Consequently, all of the first to third rotation elements of the third planetary gear set PG3 are also integrated, and furthermore, the rotation elements of all of the planetary gear sets are integrated, so that the power input to the input shaft IN is output as it is by forming a 1:1 gear ratio with the output shaft OUT, implementing the sixth shifting stage.

A seventh shifting stage is implemented by releasing the third clutch CL3 from the sixth shifting stage state and engaging the first brake B1.

In the state where the first brake B1 is engaged and thus the first planet carrier C1 and the second sun gear S2 connected to the seventh shaft SH7 are fixed, the power of the input shaft IN is input to the first sun gear S1, the third sun gear S3, and the fifth sun gear S5, and is then shifted and made faster by the fifth planet carrier C5 of the fifth planetary gear set PG5, forming the seventh shifting stage.

An eighth shifting stage is implemented by releasing the first clutch CL1 from the seventh shifting stage state and engaging the third brake B3.

In the state where the first brake B1 is engaged so that the first planet carrier C1 and the second sun gear S2 connected to the seventh shaft SH7 are fixed and the third brake B3 is engaged so that the fourth sun gear S4 connected to the ninth shaft SH9 is fixed, the power of the input shaft IN is input to the first sun gear S1, the third planet carrier C3, and the fourth ring gear R4, and is then shifted and made faster by the fifth planet carrier C5 of the fifth planetary gear set PG5, forming the eighth shifting stage.

A ninth shifting stage is implemented by releasing the third brake B3 from the eighth shifting stage state and engaging the second brake B2.

In the state where the first brake B1 is engaged so that the first planet carrier C1 and the second sun gear S2 connected to the seventh shaft SH7 are fixed and the second brake B2 is engaged so that the second planet carrier C2 and the third ring gear R3 connected to the eighth shaft SH8 are fixed, the power of the input shaft IN is input to the first sun gear S1, the third planet carrier C3, and the fourth ring gear R4, and is then shifted and made faster by the fifth planet carrier C5 of the fifth planetary gear set PG5, forming the ninth shifting stage.

A tenth shifting stage is implemented by releasing the first brake B1 from the ninth shifting stage state and engaging the third brake B3.

In the state where the second brake B2 is engaged so that the second planet carrier C2 and the third ring gear R3 connected to the eighth shaft SH8 are fixed and the third brake B3 is engaged so that the fourth sun gear S4 connected to the ninth shaft SH9 is fixed, the power of the input shaft IN is input to the first sun gear S1, the third planet carrier C3, and the fourth ring gear R4, and is then shifted and made faster by the fifth planet carrier C5 of the fifth planetary gear set PG5, forming the tenth shifting stage.

An R-stage, which is the reverse shifting stage, is implemented by causing the third clutch CL3, the second brake B2, and the third brake B3 to be engaged with each other.

In the state where the second brake B2 are engaged and thus the second planet carrier C2 and the third ring gear R3 connected to the eighth shaft SH8 are fixed and the third brake B3 is engaged and thus the fourth sun gear S4 connected to the ninth shaft SH9 is fixed, the power of the input shaft IN is input to the first sun gear S1, and is then reversed and made slower by the fifth planet carrier C5 of the fifth planetary gear set PG5, forming the reverse shifting stage.

As described above, with the configuration described above, the planetary gear train of an automatic transmission for a vehicle according to an exemplary embodiment of the present invention forms shifting stages of 10 forward speeds and 1 reverse speed and has a gear ratio span of 9.0. Thus, fuel efficiency may be improved by making it possible to drive the engine mainly in a more efficient region.

In an exemplary embodiment of the present invention, the minimum inter-stage ratio is 1.192 or more, and linearity is ensured in the transition of change of the inter-stage ratio according to a shifting stage change, similarly to the ideal tendency of change of the inter-stage ratio, so that vehicle acceleration, the sense of the sense of rhythm of the engine speed, and the like before and after shifting may be improved, maximizing the driving performance of the vehicle.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "internal", "external", "inner," "outer", "forwards" and "backwards" are used to describe features of the exemplary embodiments with reference to the positions of such features as displayed in the figures.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A planetary gear train apparatus of an automatic transmission for a vehicle, the planetary gear train apparatus comprising:
   an input shaft configured to receive power;
   an output shaft configured to output power;
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary gear set having a tenth rotation element, an eleventh rotation element, and a twelfth rotation element;
   a fifth planetary gear set having a thirteenth rotation element, a fourteenth rotation element, and a fifteenth rotation element;
   a first shaft fixedly connected to the first rotation element and to the input shaft;
   a second shaft fixedly connected to the fourteenth rotation element and to the output shaft;
   a third shaft fixedly connected to the third rotation element;
   a fourth shaft fixedly connected to the sixth rotation element, to the eleventh rotation element, and to the fifteenth rotation element;
   a fifth shaft fixedly connected to the seventh rotation element and to the thirteenth rotation element;
   a sixth shaft fixedly connected to the eighth rotation element and to the twelfth rotation element;
   a seventh shaft fixedly connected to the second rotation element and to the fourth rotation element;

an eighth shaft fixedly connected to the fifth rotation element and to the ninth rotation element; and a ninth shaft fixedly connected to the tenth rotation element.

2. The planetary gear train apparatus of claim 1, further including:

six coupling elements configured to selectively connect two shafts among the first to ninth shafts or a transmission housing to a shaft among the first to ninth shafts, wherein three coupling elements among the six coupling elements are operatively controlled such that a predetermined shifting stage among forward and reverse shifting stages is implemented.

3. The planetary gear train apparatus of claim 2, wherein the six coupling elements comprise:

three clutches configured to interconnect two shafts among the first to ninth shafts; and three brakes configured to selectively connect a shaft which is not connected to the input shaft or to the output shaft among the first to ninth shafts, to the transmission housing.

4. The planetary gear train apparatus of claim 2, wherein the six coupling elements comprise:

a first clutch mounted between the first shaft and the fifth shaft;

a second clutch mounted between the first shaft and the sixth shaft;

a third clutch mounted between the third shaft and the sixth shaft;

a first brake mounted between the seventh shaft and the transmission housing;

a second brake mounted between the eighth shaft and the transmission housing; and a third brake mounted between the ninth shaft and the transmission housing.

5. The planetary gear train apparatus of claim 1, wherein the first rotation element, the second rotation element, and the third rotation element include: a first sun gear, a first planet carrier, and a first ring gear, respectively, wherein the fourth rotation element, the fifth rotation element, and the sixth rotation element include: a second sun gear, a second planet carrier, and a second ring gear, respectively, wherein the seventh rotation element, the eighth rotation element, and the ninth rotation element include: a third sun gear, a third planet carrier, and a third ring gear, respectively, wherein the tenth rotation element, the eleventh rotation element and the twelfth rotation element include: a fourth sun gear, a fourth planet carrier and a fourth ring gear, respectively, and wherein the thirteenth rotation element, the fourteenth rotation element, and the fifteenth rotation element include: a fifth sun gear, a fifth planet carrier, and a fifth ring gear, respectively.

6. The planetary gear train apparatus of claim 1, wherein the first to fifth planetary gear sets are mounted in an order of the first, second, third, fourth, and fifth planetary gear sets from one side to another side thereof with respect to an engine side.

7. A planetary gear train apparatus of an automatic transmission for a vehicle, the planetary gear train apparatus comprising:

a first planetary gear set having first, second, and third rotation elements, one rotation element of which is fixedly connected to an input shaft;

a second planetary gear set having first, second, and third rotation elements, one rotation element of which is continuously connected to one rotation element of two remaining rotation elements among the first to third rotation elements of the first planetary gear set;

a third planetary gear set having first, second, and third rotation elements, one rotation element of which is selectively connectable to the input shaft by a first clutch, another rotation element of which is selectively connectable to the one rotation element of the first planetary gear set, which is fixedly connected to the input shaft and another rotation element of the two remaining rotation elements among the first to third rotation elements of the first planetary gear set by a second clutch and a third clutch, respectively, and a remaining one rotation element of which is continuously connected to one rotation element of two remaining, rotation elements among the first, second, and third rotation elements of the second planetary gear set;

a fourth planetary gear set having first, second, and third rotation elements, one rotation element of which is continuously connected to the another rotation element of the first to third rotation elements of the third planetary gear set;

a fifth planetary gear set having first, second, and third rotation elements, one rotation element of which is continuously connected to the one rotation element of the third planetary gear set, another rotation element of which is connected to the output shaft, and a remaining one rotation element of which is continuously connected to a another rotation element of two remaining rotation elements among the first to third rotation elements of the fourth planetary gear set and another rotation element of the two remaining rotation elements among the first to third rotation elements of the second planetary gear set;

a first brake mounted to restrain a rotation of the one rotation element of the second planetary gear set, wherein the one rotation element of the second planetary gear set is continuously connected to the one rotation element of the two remaining rotation elements among the first, second and third rotation elements of the first planetary gear set;

a second brake mounted to restrain a rotation of the one rotation element of the two remaining rotation elements among the first second and third rotation elements of the second planetary gear set, wherein the one rotation element of the two remaining rotation elements among the first, second and third rotation elements of the second planetary gear set is continuously connected to the remaining rotation element of the third planetary gear set; and a third brake mounted to restrain a rotation of a remaining rotation element of the two remaining rotation elements among the first to third rotation elements of the fourth planetary gear set.

8. The planetary gear train apparatus of claim 7, wherein the one rotation element of the first planetary gear set, which is continuously connected to the input shaft, is the first rotation element of the first planetary gear set;

wherein the first rotation element of the second planetary gear set is continuously connected to a second rotation element of the first planetary gear set;

wherein the first rotation element of the third planetary gear set is selectively connectable to the input shaft, the second rotation element of the third planetary gear set is selectively connectable to each of the first rotation element and the third rotation element of the first planetary gear set, and the third rotation element of the third planetary gear set is continuously connected to the second rotation element of the second planetary gear set;

wherein the third rotation element of the fourth planetary gear set is continuously connected to the second rotation element of the third planetary gear set; and wherein the first rotation element of the fifth planetary gear set is continuously connected to the first rotation element of the third planetary gear set, the second rotation element of the fifth planetary gear set is fixedly connected to the output shaft, and the third rotation element of the fifth planetary gear set is continuously connected to the second rotation element of the fourth planetary gear set.

9. The planetary gear train apparatus of claim 8, wherein the first rotation element of the first planetary gear set is a first sun gear, the second rotation element of the first planetary gear set is a first planet carrier, and the third rotation element of the first planetary gear set is a first ring gear;

wherein the first rotation element of the second planetary gear set is a second sun gear, the second rotation element of the second planetary gear set is a second planet carrier, and the third rotation element of the second planetary gear set is a second ring gear;

wherein the first rotation element of the third planetary gear set is a third sun gear, the second rotation element of the third planetary gear set is a third planet carrier, and the third rotation element of the third planetary gear set is a third ring gear;

wherein the first rotation element of the fourth planetary gear set is a fourth sun gear, the second rotation element of the fourth planetary gear set is a fourth planet carrier, and the third rotation element of the fourth planetary gear set is a fourth ring gear; and wherein the first rotation element of the fifth planetary gear set is a fifth sun gear, the second rotation element of the fifth planetary gear set is a fifth planet carrier, and the third rotation element of the fifth planetary gear set is a fifth ring gear.

10. The planetary gear train apparatus of claim 9, wherein the first brake is mounted to restrain a rotation of the first planet carrier of the first planetary gear set and the second sun gear of the second planetary gear set, wherein the second brake is mounted to restrain a rotation of the second planet carrier of the second planetary gear set, and wherein the third brake is mounted to restrict a rotation of the fourth sun gear of the fourth planetary gear set.

11. The planetary gear train apparatus of claim 10, wherein the first brake is mounted between the first planet carrier of the first planetary gear set and a transmission housing to restrain the rotation of the first planet carrier of the first planetary gear set and the second sun gear of the second planetary gear set, wherein the second brake is mounted between the second planet carrier of the second planetary gear set and the transmission housing to restrain the rotation of the second planet carrier of the second planetary gear set, and wherein the third brake is mounted between the fourth sun gear of the fourth planetary gear set and the transmission housing to restrict the rotation of the fourth sun gear of the fourth planetary gear set.

12. The planetary gear train apparatus of claim 10, wherein the first clutch is mounted between the third sun gear of the third planetary gear set and the input shaft to selectively connect the third sun gear of the third planetary gear set and the input shaft, wherein the second clutch is mounted between the third planet carrier of the third planetary gear set and the first sun gear of the first planetary gear set to selectively connect the third planet carrier of the third planetary gear set and the first sun gear of the first planetary gear set, and wherein the third clutch is mounted between the third planet carrier of the third planetary gear set and the first ring gear of the first planetary gear set to selectively connect the third planet carrier of the third planetary gear set and the first ring gear of the first planetary gear set.

13. The planetary gear train apparatus of claim 7, wherein the input shaft and the output shaft are mounted concentrically, and wherein the first to fifth planetary gear sets are mounted in an order of the first planetary gear set, the second planetary gear set, the third planetary gear set, the fourth planetary gear set, and the fifth planetary gear set in a direction from the input shaft toward the output shaft.

14. A planetary gear train apparatus of an automatic transmission for a vehicle, the planetary gear train apparatus comprising:

a first planetary gear set, a second planetary gear set, a third planetary gear set, a fourth planetary gear set, and a fifth planetary gear set, each of which includes first, second, and third rotation elements;

six coupling elements configured to provide a variable frictional force; and first to ninth shafts connected to the first to third rotation elements of each of the first to fifth planetary gear sets, wherein the first shaft is fixedly connected to the first rotation element of the first planetary gear set and to the input shaft, wherein the second shaft is fixedly connected to the second rotation element of the fifth planetary gear set and to the output shaft, wherein the third shaft is fixedly connected to the third rotation element of the first planetary gear set, wherein the fourth shaft is fixedly connected to the third rotation element of the second planetary gear set, to the second rotation element of the fourth planetary gear set, and to the third rotation element of the fifth planetary gear set, wherein the fifth shaft is fixedly connected to the first rotation element of the third planetary gear set and to the first rotation element of the fifth planetary gear set, wherein the sixth shaft is fixedly connected to the second rotation element of the third planetary gear set and to the third rotation element of the fourth planetary gear set, and wherein remaining three shafts among the first to ninth shafts are configured for being selectively connectable to a transmission housing.

15. The planetary gear train apparatus of claim 14,
the remaining three shafts, which are configured for being selectively connectable to the transmission housing, include the seventh shaft, the eighth shaft, and the ninth shaft,
wherein the seventh shaft is fixedly connected to the second rotation element of the first planetary gear set and to the first rotation element of the second planetary gear set,
wherein the eighth shaft is fixedly connected to the second rotation element of the second planetary gear set and to the third rotation element of the third planetary gear set, and
wherein the ninth shaft is fixedly connected to the first rotation element of the fourth planetary gear set.

16. The planetary gear train apparatus of claim 15,
wherein the six coupling elements include first to third clutches and first to third brakes,
wherein the first clutch is mounted between the first shaft and the fifth shaft,
wherein the second clutch is mounted between the first shaft and the sixth shaft,
wherein the third clutch is mounted between the third shaft and the sixth shaft,
wherein the first brake is mounted between the seventh shaft and the transmission housing,
wherein the second brake is mounted between the eighth shaft and the transmission housing, and
wherein the third brake is mounted between the ninth shaft and the transmission housing.

17. The planetary gear train apparatus of claim 14, wherein the first to fifth planetary gear sets are mounted in an order of the first planetary gear set, the second planetary gear set, the third planetary gear set, the fourth planetary gear set, and the fifth planetary gear set in an axial direction of the input shaft and the output shaft.

18. The planetary gear train apparatus of claim 14, wherein the first, second, and third rotation elements of each of the first to fifth planetary gear sets are mounted in an order of the first rotation element, the second rotation element, and the third rotation element toward a radially external side from a rotation center thereof.

\* \* \* \* \*